J. V. CLARK.
TIRE CHANGING MACHINE.
APPLICATION FILED DEC. 27, 1919.
1,432,967.
Patented Oct. 24, 1922.
2 SHEETS—SHEET 1.
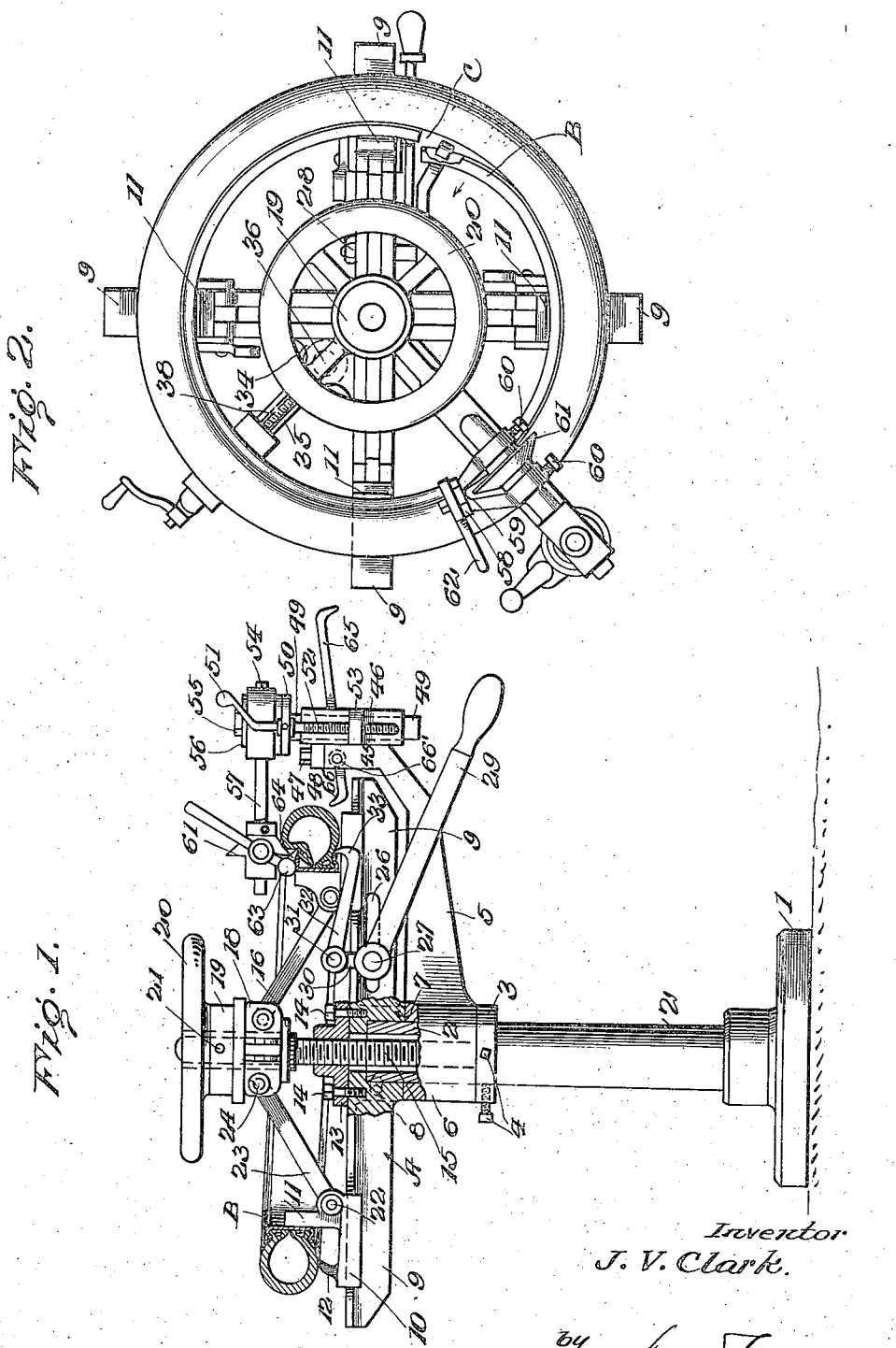
Inventor
J. V. Clark.

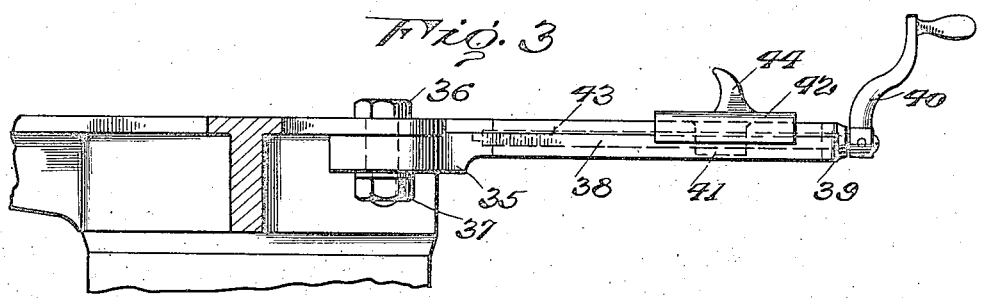
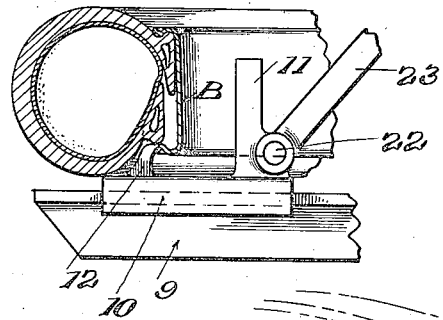
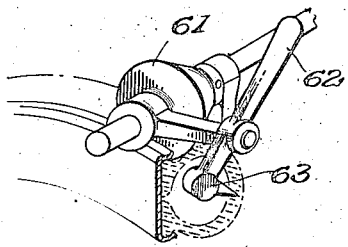
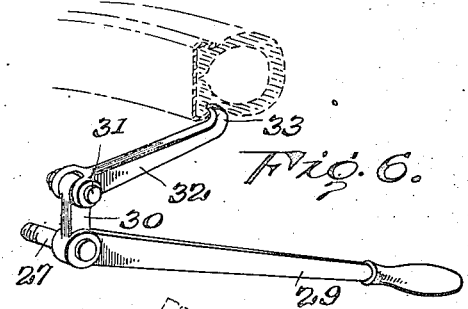
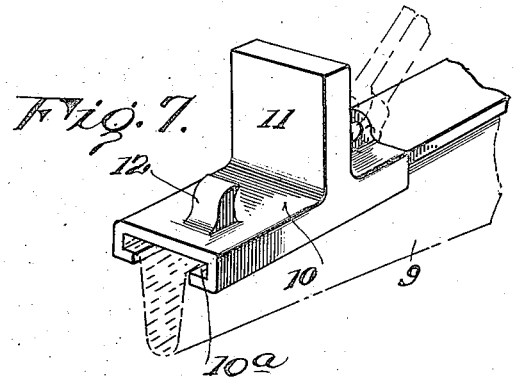

Patented Oct. 24, 1922.

1,432,967

UNITED STATES PATENT OFFICE.

JOSEPH V. CLARK, OF STEUBENVILLE, OHIO.

TIRE-CHANGING MACHINE.

Application filed December 27, 1919. Serial No. 347,709.

*To all whom it may concern:*

Be it known that I, JOSEPH V. CLARK, a citizen of the United States, residing at Steubenville, in the county of Jefferson and State of Ohio, have invented certain new and useful Improvements in Tire-Changing Machines, of which the following is a specification.

This invention relates to a tire changing machine for use in connection with removing and applying the steel rims used with demountable pneumatic tires.

In demountable rims there are two types of rims in use at the present time, namely, the clincher rim which accommodates the pneumatic tire having a more or less elastic bead which may be stretched over the edge of a rim having a U-shaped cross section and also the straight side tire which has an inflexible bead or inner periphery and is used with a rim which is split transversely so that the ends of the rim, at the split, may be displaced relative to each other for contracting the rim to remove the tire and, after a tire has been put in position on the rim, the said rim is expanded so that the ends again meet to form a continuing circumferential surface supporting the tire.

In the past great difficulty has been experienced in removing tires of the clincher type due to the fact that, after long use, the beads of the tire adhere to the rim and it is difficult to separate or displace the beads sufficiently to permit the same to be pried over the edge of the rim. Likewise, in the use of straight side tires and rims great difficulty is experienced in initially displacing one end of the rim and contracting the rim so that the tire may be removed, and even more difficulty is experienced in again expanding the rim into place.

Many devices for accomplishing the above mentioned operation have been tried but are of doubtful success and hence it is the object of this invention to provide a machine which will operate to separate the bead of a clincher tire from the rim to permit the removal of the tire from the rim.

Another object is to provide a machine which engages the rim of the straight side tire at several points and draws one end inwardly while contracting the remainder of the rim so as to separate the rim from the tire.

A further object is to provide means by which the straight side rim may again be expanded into place in the tire.

In the drawings:

Figure 1 is a side elevation, with parts cut-away showing the tire changing machine;

Fig. 2 is a top plan view of the machine;

Fig. 3 is a detail side elevation of the rim end contracting member;

Fig. 4 is an enlarged detail view of the rim contracting block in the act of operation;

Fig. 5 is a detail perspective view of the bead loosening bevel wheel in the act of operation;

Fig. 6 is a detail perspective view of another form of rim end contracting means, and Fig. 7 is a perspective view of one of the expanding and contracting blocks.

In detail: the machine comprises a pedestal 1 having a vertical column 2 on which is mounted a stop collar 3 held in position by set screws 4. Above the collar 3 is mounted a radial arm 5 having a hub 6 resting on collar 3, said arm 5 being rotatable with respect to column 2.

Above the hub 6 of the arm 5 the column 2 carries a spider A comprising a hub 7 fitted onto the column 2 and held against rotation by set screws 8. The hub 7 carries diametrically opposite radially extending arms 9 which are substantially T-shape in cross section, as shown in Fig. 7, and receive expansion and contraction blocks 10 having channels 10ᵃ which mount said blocks for radial sliding movement on arms 9. The blocks 10 have perpendicular abutments 11 which may be forced or expanded along arms 9 to expand the rim; or hooks 12 carried by blocks 10 may be engaged under the bead edge of the rim, as shown in Fig. 4 and said blocks then moved inward or contracted to contract the rim and cause it to open at the break therein so that the tire may be removed therefrom.

In order to provide for moving blocks 10 a flange nut 13 is bolted as at 14 to the hub 7 of the spider and accommodates the threaded spindle 15 which, at its upper end receives the bushing 16 passing freely through a cross head 18 and receiving the hub 19 of a hand wheel 20, said bushing 16 and hub 19 being locked to the threaded spindle 15 by a pin 21 extending therethrough.

From the foregoing construction it will be seen that as the hand wheel 20 is rotated to move the screw spindle 15 in and out of the nut 13 the cross head 18 will be raised and lowered. In order to translate the vertical reciprocal movement of cross head 18 into horizontal radial motion in the blocks 10, the latter are connected by pins 22 to links 23, the upper ends of which are received between ears 25 on cross head 18 and fastened thereto by pins 24. With this arrangement the rotary motion of the hand wheel 20 moving the threaded spindle 15 in and out of the nut 13 will serve to expand or contract the blocks 10 along their respective radial arms.

One of the radial arms 9 is slotted as shown at 26 to receive a fulcrum pin 27 which may be moved in said slot and fastened in any position therein by means of a nut 28. The fulcrum pin 27 carries a downwardly extending lever 29 having an arm 30 connecting pivotally at 31 with a hook arm 32 having an upwardly turned hook 33 for engagement with the bead edge of a rim B.

The preceding construction is sufficient for manipulating the machine for the purpose of removing a straight side tire from its complemental rim which is split transversely as shown at C in Fig. 2. When it is desired to remove such a rim the rim is placed on the machine with the blocks 10 in the position shown in Fig. 1 and said blocks are then gradually contracted by rotating the hand wheel 20 until hooks 12 lie in the position shown in Fig. 2 and hook 33 is in the position shown in Fig. 1. This position is shown in top plan view in Fig. 2. Then the lever 29 is operated to draw the end of the rim B in as shown in Fig. 2 after which the hand wheel 20 is operated to retract the blocks 10 along their respective radial arms and contract the said rim B so that its ends overlap each other and it is completely loosened from the tire. When this has been done the tire may be easily removed from the rim by simply lifting it away from the machine.

To apply a straight side tire the rim is first contracted and the tire placed in position thereover after which the hand wheel 20 is operated to expand the blocks 10 against the inner surface of the rim as shown in Fig. 1 and, due to the fact that there are four of these blocks operating at equi-distant points along the rim, said rim will be evenly expanded until the overlapping ends snap into place with respect to each other to form the continuous supporting rim surface for the tire.

Sometimes it will be found that the rim end is particularly close fitting and does not respond to actuation of the lever 29 due to the fact that the leverage which a man can apply thereto is insufficient for him to withdraw the rim end. In order to overcome this difficulty there is pivotally mounted on a web 34 of the hub 7 an additional arm 35 held in place by bolt 36 and nut 37 so that it has a certain radius of swing between two of the arms 9. This arm 35 is formed similarly to the radial arms 9 but accommodates a screw spindle 38 working through a collar 39 and provided with a crank 40 for rotating said spindle. The spindle 38 engages a nut 41 on a block 42 channeled to move along the flanges 43 of the arm 38 and having a hook 44 which may be engaged under the edge of the end of the rim similar to the engagement of the hook 33 with the end of the rim. After the hook 44 has been engaged under the edge of the rim the handle 40 is rotated or turned to move the block 42 along the arm 35 to push the end of the rim inwardly and disengage the two ends of the rim from each other to permit further contraction of the rim for the removal of the tire.

In operating on clincher tires, the tire and rim are placed in the position shown in Fig. 1 but due to the fact that there is no break in the rim the hooks 12 cannot be used and therefore the hand wheel 20 is turned to expand the blocks 10 so that the abutment faces 11 hold the rim rigid on the machine. The arm 5 carries a vertical extension 45 to which a head 46 is secured by means of bolts 47. The bolts 47 extend through a flange 48 carried by the head 46 and the head 46 is made hollow as indicated by dotted lines in Fig. 1 to receive the vertical neck 49 having a flange 50 accommodating the crank 51 connected with the screw element 52 working in the threaded lug 53 of the head 46. By rotating the crank 51 the flange 50 and its attendant parts will be moved up or down vertically in the head 46. Swiveled on the neck 49 above the flange 50 is a member 54 which is prevented from coming off the neck 49 by a suitable nut 55 and washer 56. The member 54 carries an inwardly extending arm 57 which may be swung out of the way by pivoting the member 54 around the neck 49. The arm 57 accommodates the member 58 having a bifurcated portion 59 which is bored to slide along the arm 57 and be fastened by set screws 60. Between the bifurcations of 59 and rotatable on the arm 57 is a beveled disk 61. At 58 a lever 62 is pivoted which is extended as at 63 and carries a widened bevel member 64. The lever 62 swings in a vertical plane.

In removing a clincher tire from the rim the member 54 is adjusted to the proper height by proper manipulation of the handle 51 so that the beveled disk 61 will engage the tire adjacent the bead, after which said handle is turned to move the member 54 down so that the disk 61 will depress the bead. At the same time assistance is rendered by means of the lever 62 being operated to the position shown in Fig. 1. When the parts are in this position the arm 5 is swung around the column 2 so that the bevel disk 61 moves circumferentially around the rim loosening the bead at all points and allowing the same to be easily worked over the edge of the rim. To assist in removing the bead on the lower side a hook bar 65 is provided in the extension 45 and carries an upwardly turned hooked end 66 which may be engaged with the lower side of the tire to loosen the bead. This hooked bar 65 may be adjusted to any convenient position and so held by the set screw 66' and, of course, as the arm 5 moves around the tire the hook 66 will loosen the lower bead.

I claim:

1. In a tire-changing machine, the combination of a plurality of radial supporting arms, blocks slidably mounted on said arms and carrying rim expanding and contracting elements, means for actuating said blocks, one of the radial arms being provided with a longitudinal slot, a lever having a pivot adjustably secured in said slot, an arm rising from said lever, and a hook arm pivoted to said last-mentioned arm and extending outwardly therefrom to initially displace the abutting ends of the rim.

2. In a tire changing machine, a tire support having radial arms, expanding and contracting members movable on said arms, means for moving said members, a hook arm for initially displacing the abutting ends of the rim, and a lever adjustably pivoted on one of said radial arms and operatively connected to said hook arm.

3. In a tire changing machine, the combination of a hollow stationary column, a plurality of supporting arms radiating from said column, blocks slidably mounted on said arms, a rim-engaging abutment rising from each of said blocks, an inwardly projecting rim engaging hook on each of said blocks outwardly beyond the abutment thereon, a nut on the upper end of the column, a threaded spindle engaged in and extending through said nut, a head secured on said spindle, a collar swiveled on said head, and links connecting said collar with the respective blocks.

In testimony whereof I affix my signature.

JOSEPH V. CLARK. [L. S.]